(12) United States Patent
Brabec et al.

(10) Patent No.: US 7,227,152 B2
(45) Date of Patent: Jun. 5, 2007

(54) DEVICE TO MEASURE A RADIATION DOSE

(75) Inventors: Christoph Brabec, Erlangen (DE); Martin Hoheisel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 158 days.

(21) Appl. No.: 10/809,966

(22) Filed: Mar. 26, 2004

(65) Prior Publication Data

US 2004/0227097 A1    Nov. 18, 2004

(30) Foreign Application Priority Data

Mar. 26, 2003    (DE)   ................................. 103 13 602

(51) Int. Cl.
*G01T 1/24*    (2006.01)
(52) U.S. Cl. ............................. 250/370.12; 250/370.07
(58) Field of Classification Search ........... 250/370.07, 250/370.12
See application file for complete search history.

(56) References Cited

U.S. PATENT DOCUMENTS 4,661,168 A * 4/1987 Maier et al. .................. 438/60
5,262,649 A * 11/1993 Antonuk et al. ........ 250/370.09
6,198,091 B1 * 3/2001 Forrest et al. ........... 250/214.1
6,362,484 B1 * 3/2002 Beyne et al. ............... 250/374
2004/0183070 A1 * 9/2004 Afzali-Ardakani et al. ... 257/40

FOREIGN PATENT DOCUMENTS

RU    1060035 A1 *   2/1993

OTHER PUBLICATIONS

JP 73032940 B, Japan, Kohashi et al.*

* cited by examiner

*Primary Examiner*—Renee Luebke
*Assistant Examiner*—Mary Zettl
(74) *Attorney, Agent, or Firm*—Schiff Hardin LLP

(57) ABSTRACT

A device to measure a radiation dose, in particular an x-ray radiation dose, which absorbs radiation and provides an absorption-conditional output signal representing a measurement for the dose, has at least one absorption structure disposed on a foil-like carrier, made from thin-film layers disposed on top of one another that form at least one thin-film diode structure that supplies the output signal.

14 Claims, 3 Drawing Sheets

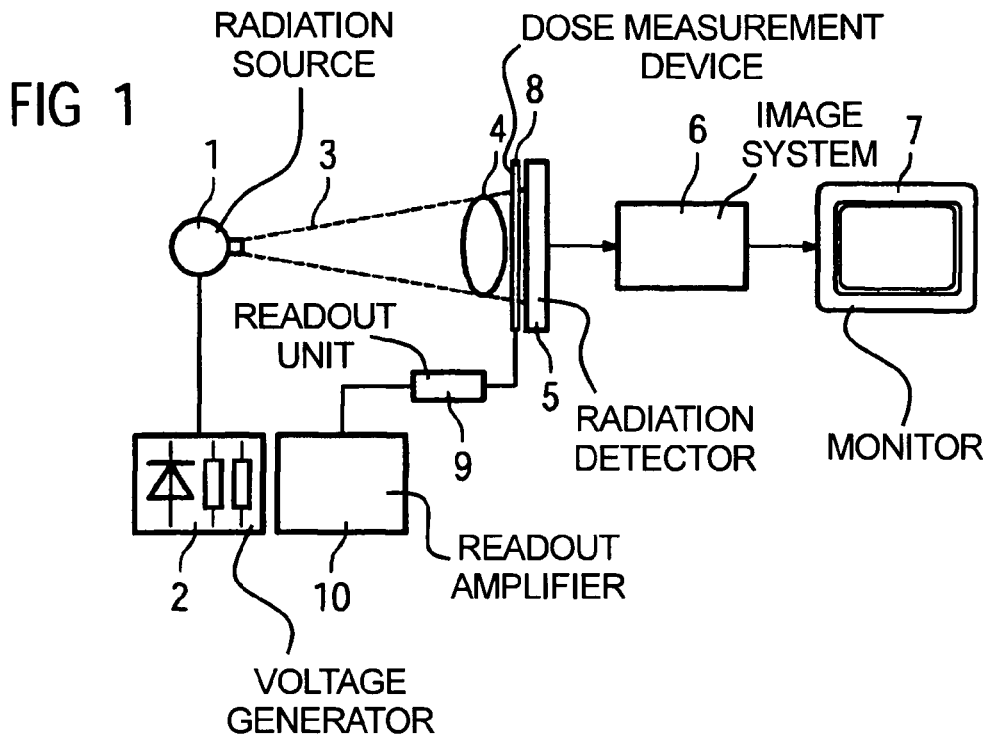
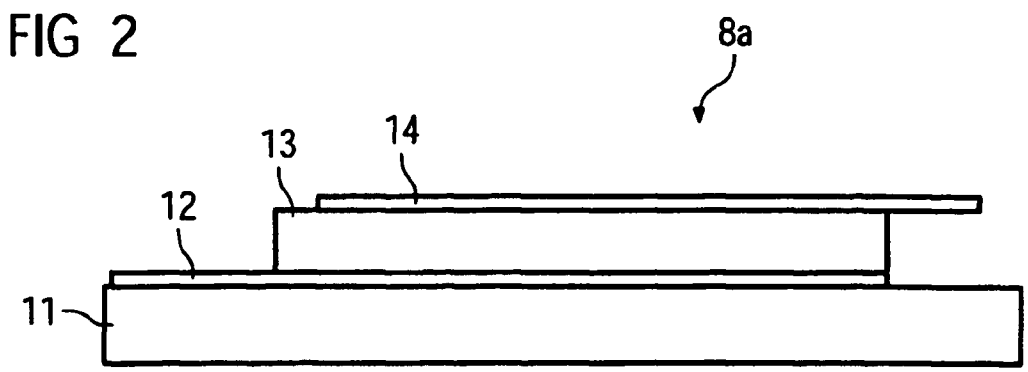
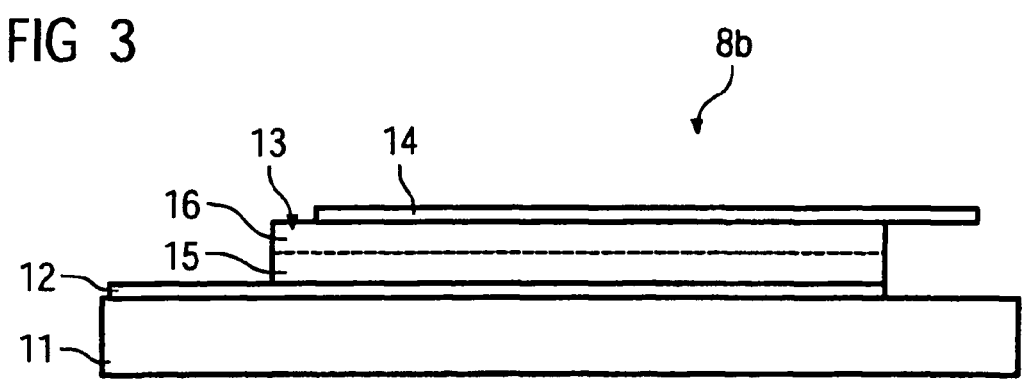

DEVICE TO MEASURE A RADIATION DOSE

BACKGROUND OF THE INVENTION

1. Field of the Invention

The present invention concerns a device to measure a radiation dose, in particular an x-ray radiation dose, of the type that absorbs radiation and provides an output signal dependent on the absorption which represents a measure for the dose.

2. Description of the Prior Art

In radiation image acquisition systems, in particular in x-ray systems as they are primarily used in medical diagnostics, it is necessary to regulate as precisely as possible the dose of the radiation that hits the patient to be examined. Typically an automatic dose regulator (Automatic Exposure Control) is used for this purpose, with either the radiation dose striking the detector or the unabsorbed radiation dose still present behind the detector being measured. The voltage generator of the x-ray tube is then regulated using this measurement value. Generally the duration of the emitted x-ray pulse is varied.

Conventionally, an ionization chamber disposed in front of the x-ray detector or the film cassette is used for such an automatic dose regulation. This ionization chamber (that normally has a number of planar absorption regions) provides an output signal, dependent on the degree of the absorbed radiation dose, which controls the generator. A disadvantage of such an ionization chamber is its absorption in the beam path (which interferes in particular in mammography) as well as its thickness (of up to approximately 12 mm) and as well as its tendency towards microphony.

As described, ionization chambers arranged in front of the detector or the film cassette interfere with mammography exposures due to the chamber size and the chamber absorption, which is why in such cases the dose measurement device is arranged behind the detector or the film cassette, and why a silicon diode is used for this purpose that absorbs the remaining x-ray radiation that is, for example, transmitted by the film-foil system and transmits an electrical signal that is in turn used for regulation.

SUMMARY OF THE INVENTION

An object of the present invention is based to provide a device that enables a dose detection in front of the detector or the film cassette while preventing the problems cited above.

This object is achieved in accordance with the invention by a device of the type initially described having at least one absorption structure arranged on a foil-like carrier made of thin-film layers arranged on top of one another, with at least one thin-film diode structure that supplies the output signal.

The invention uses a thin-film absorption structure assembled like a sandwich, whereby the layer stack forming a diode structure that provides the output signal based on the absorption. The use of very thin layers as well as a foil-like carrier that should itself absorb as little radiation as possible overall leads to an extremely thin measurement arrangement that also generates a sufficient electrical signal given low incident radiation dose or, respectively, low degree of absorption in order to effect an exact dose measurement. Moreover, the use of the very thin layers offers the possibility to also use such a device for sensitive examinations such as, for example, in mammography, since the disadvantages arising from the size and thickness of known ionization chambers are no longer given here. Finally, the inventive device also shows no tendency whatsoever toward microphony since no oscillatable air chambers are present. A further advantage of the thin-layer implementation of the device, which can be implemented thinner than 2 mm (preferably thinner than 1 mm) is that it is flexible, thus presents no rigid system, and thus the possibility exists to simply adapt it (for example) to uneven detectors.

The diode structure itself inventively has two film electrodes and a photoactive semiconductor film layer arranged between them in which radiation-conditional electron-hole pairs are generated, and with which an output signal is generated that is dependent on the incident radiation dose.

In an embodiment of the invention, the semiconductor layer is composed of one or more organic semiconductors. An advantage of such organic semiconductors is the simple processing possibilities and the possibility to be able to also generate extremely thin layers with large surface area. It is conceivable without anything further to produce layers with a thickness of $\leq 1$ μm on a surface that, for example, corresponds to the detector size. A semiconductor film layer can form a single semiconductor; alternatively it can form a combination made from two or more different semiconductor types.

According to a first embodiment of the invention, the semiconductor film layer can be formed of at least one organic semiconductor that acts as a donor and an added material acting as an acceptor. A donor/acceptor polymer mixture is also used here, whereby one component acts as an electron donor and the other acts as an electron acceptor.

As an alternative, a heterojunction diode structure can be formed. According to this embodiment of the invention, a heterojunction is fashioned within the diode film layer, i.e. a pn- and density-junction serving as the charge carrier separation, realized by the use of different semiconductor materials. Two sub-layers made of different semiconductors can be used that form a heterojunction, According to this embodiment of the invention, a real material border that defines the heterojunction is thus realized. As an alternative, both semiconductors can be used, such that a number of local heterojunctions form in the entire layer volume.

In a further alternative the semiconductor film layer is formed from a semiconductor that, to form a pn-junction, is p-doped in one sub-layer and n-doped in the other sub-layer. A "real" doping-dependent pn-junction thus is realized for charge separation. It should be noted that all of the specified embodiments should primarily be realized using organic semiconductors as a semiconductor layer basis.

Polymers or plastics (synthetics) can be used as organic semiconductor materials as long as they possess semiconductor properties. Examples are semiconducting conjugated polymers, their derivatives, low-molecular weight semiconductors, or existing monomer, oligomer or polymer semiconductor plastics.

For an optimally low absorption In the region of the film electrodes, in an embodiment of the invention one or both of the film electrodes is formed of a conductive, preferably doped, polymer in order to ensure a high optical transparency. When this transparency is not necessary, thin metal films or metal alloy films or metal oxide or alloy oxide films can alternatively also be used. The layer thickness should be as small as possible in order to keep the radiation absorption in the electrodes as low as possible.

The foil-like carrier itself can be a plastic foil; as an alternative to this, a glass foil can also be used, whereby this is non-negligible with regards to Its x-ray absorption and as a result its thickness should be as small as possible.

As described, a measurement element that generates a sufficient electrical signal in many application cases and shows only an extremely slight radiation absorption can be realized with such an inventive device or, respectively, such an inventive absorption structure. It may occur, however, that the electrical signal is very small due to the low radiation absorption of the inventive absorption or diode arrangement. In order to improve this, a particularly advantageous embodiment of the invention also provides that a scintillator is formed within the absorption structure. The scintillator serves to convert the incident radiation (thus for example the x-ray radiation) into visible light that is then used for the generation of the electrical output signal and leads to charge carrier generation in the organic semiconductor material, While the scintillator absorbs only very little x-ray radiation, the degree of absorption is thereby only insignificantly increased, but the generated signal can intensified as appropriate so that it can be evaluated well.

According to an embodiment of the invention, the scintillator can thereby be applied to one of the film electrodes in the form of a thin-film layer. In this embodiment of the invention, the scintillator or the scintillator layer is situated uppermost, thus is directly struck by the incident radiation. The generated light quanta are coupled through the film electrode into the semiconductor film layer situated underneath.

As an alternative, the scintillator can be integrated in the film electrode. The scintillator can be mixed into the electrode material (preferably a conductive polymer material) as an extremely fine-grained powder. The film electrode thus possesses a double function, namely on the one hand that of the contacting, and on the other hand that of a scintillator layer.

In a further embodiment of the invention the scintillator is integrated into the photoactive semiconductor film layer. Here the scintillator material Is directly introduced into the organic semiconductor In very finely dispersed form, primarily in the form of what are known as nano-particles. The semiconductor layer thus obtained glows upon transit by x-ray radiation due to the radiation conversion by the scintillator inside, whereby electron-hole pairs are generated in the entire layer volume, This means the conversion of the incident radiation into visible light ensues directly at the location of the charge carrier generation; a coupling from outside into the photoactive semiconductor layer is no longer necessary.

The inventive device can be produced very thin due to its film or layer design. Its total thickness including foil-like carrier and absorption structure can be $\leq 2$ mm, preferable $\leq 1$ mm. The thickness of the photoactive semiconductor layer itself can be $\leq 2$ μm, in particular less than $\leq 1$ μm. The thickness of a film electrode should be $\leq 2$ μm, in particular $\leq 1$ μm and preferably $\leq 100$ nm, in particular in the case of the use of metal or alloy electrodes or corresponding oxide electrodes, where the layer thickness preferably should be in the range of 10 nm or below.

The layers forming the absorption structure can be generated in different manners. Examples are thermal vaporization, cathode sputtering, solution centrifuging or a printing process, in particular a screen printing method.

As described, the formation as a film structure, in particular using organic semiconductors, allows the very thin but at the same time large-surface generation of suitable layers, and thus suitable structures. According to an embodiment, as a result of this a number of adjacent absorption structures that deliver separate output signals are provided on the carrier. The possibility thus exists to produce the measurement device at a size that corresponds to the size of the detector (implemented, for example, as a planar solid-state detector), whereby for example 3 or 4 absorption structures (that, combined, approximately correspond to the detector area) are part of the device. Switching among these absorption structures can be undertaken, i.e. their separate output signals can be acquired and evaluated such that local dose measurements are possible over the entire detector surface. In a further embodiment of the invention a number of absorption structures are distributed on the carrier according to a type of matrix. For example, given a detector size of 40 cm×40 cm, the possibility exists to distribute a matrix of 10×10 absorption structures or 100×100 absorption structures over the detector surface. Each absorption structure provides a separate output signal and can be read out or controlled (triggered) separately. Naturally, the possibility also exists to read out a number of absorption structures at the same time, and to interconnect a number of absorption structures, whereby in this embodiment of the invention arbitrary absorption structure patterns can be interconnected and arbitrary local surface regions or shapes can be tapped.

Although the possibility exists to implement the inventive device as a separate component placed in front of a radiation detector, in one embodiment of the invention it is arranged on a radiation detector, in particular a solid-state radiation detector, and thus is quasi-fixed to this at the site of the manufacturer. The radiation detector and the measurement device thus form a common, unitary component.

In addition to the inventive device, the invention furthermore concerns an apparatus for radiation image acquisition having a radiation source, a radiation receiver and a device of the previously specified type to measure the radiation dose.

DESCRIPTION OF THE DRAWINGS

FIG. 1 schematically illustrates an inventive radiation image acquisition apparatus using an inventive dose measurement device.

FIG. 2 shows an inventive dose measurement device in a first embodiment.

FIG. 3 shows an inventive dose measurement device in a second embodiment.

DESCRIPTION OF THE PREFERRED EMBODIMENTS

Figure 4:
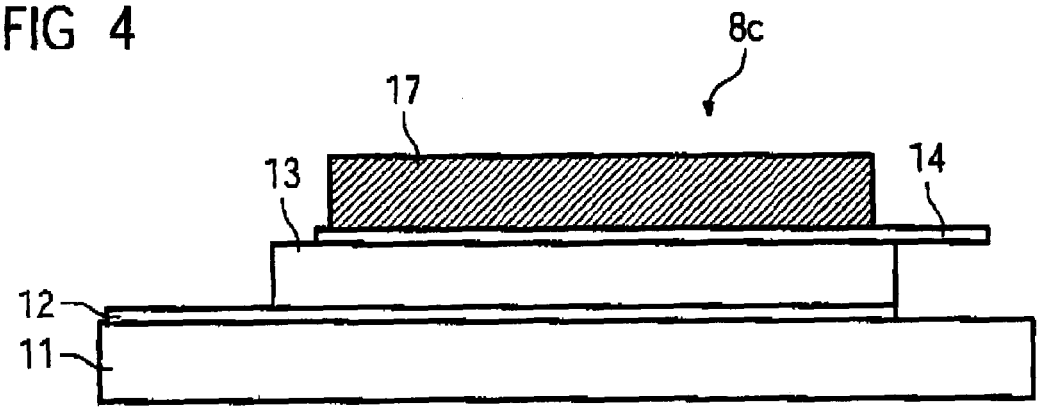
FIG. 4 shows an Inventive dose measurement device in a third embodiment.

FIG. 1 shows an inventive radiation image acquisition apparatus having a radiation source 1, for example an x-ray tube with associated high-voltage generator 2 that generates an x-ray beam 3. After penetrating the subject or patient 4 to be examined, the radiation strikes on a detector 5, for example a solid-state planar detector based on amorphous silicon. The generated image signal is processed in an image system 6. The radiation images can be viewed on the monitor 7.

An inventive dose measurement device 8 that has a thin-film diode structure that provides a dose-dependent output signal is located in the beam path in front of the radiation detector 5. Downstream from the dose measurement device 8 is a readout unit 9 as well as a readout amplifier 10 via which the output signals of the dose measurement device 8 are read out and amplified, whereby the readout amplifier 10 then emits a control signal to the high-voltage generator 2 in order to therewith regulate the dose.

FIG. 2 shows the basic assembly of an inventive dose measurement device 8a that can be used as a dose measurement device 8 in the apparatus shown In FIG. 1. A substrate or a carrier 11 is provided that is typically comprised of a polyester foil with a thickness of 20 µm to 200 µm. Polyimide foils or thin glass foils with a thickness in the range specified above can also be used, whereby given the latter the x-ray absorption is not negligible. Basically, it is a very thin carrier structure that is conducive to the overall very thin layer assembly.

Furthermore, two film electrodes 12, 14 are provided, between which is located a photoactive semiconductor film layer 13. In the semiconductor film layer 13, electron-hole pairs are generated dependent on the incident radiation; the corresponding signal is measured and directed outwards via both film electrodes 12. The film electrodes 12, 13 are primarily made from conductive doped polymers (such as, for example, polyethylenedioxythiophene or polyaniline) and are primarily applied in a thickness of typically 100 nm in order to ensure a high optical transparency. When this transparency is not necessary, the layer thickness can also be increased to approximately 1 µm in order to achieve a particularly good conductivity. Alternative to this, the film electrodes 12, 14 also can be formed from this metal films, whereby aluminum and titanium are particularly suitable. However, copper, silver or gold, calcium, barium. LiF/Al or the like can also be used. The minimal necessary layers are only 1–10 nm, such that the x-ray absorption in the metal electrode remains very slight, Further possible materials for the electrodes are metal oxides such as, for example, zinc oxide or indium tin oxide (ITO).

Among other things, conjugate polymers such as polyphenylenevinylene (PPV), polythiophene and their derivatives, or low-molecular-weight organic semiconductors such as, for example, phtalocyanine or fullerene (C-60) are suitable as materials for the semiconductor film layer 13. For example, typical semiconducting conjugate polymers include (not an exclusive list):

polyacetylene (PA) and derivatives thereof,
polyisothianaphthene (PITN) and derivatives thereof,
polythiophene (PT) and derivatives thereof,
polypyrrole (PPr) and derivatives thereof,
poly(2,5-theinylenevinylene) (PTV) and derivatives thereof,
polyfluorene (PF) and derivatives thereof,
poly(p-phenylene) (PPP) and derivatives thereof,
poly(phenylenevinylene) (PPV) and derivatives thereof,
polyquinolene and derivatives thereof,
polycarbozole and derivatives thereof,
phthalocyanine and derivatives thereof,
as well as semiconducting polyaniline (leukoemeraldine and/or leukoemeraldine base)

The layer series film electrode 12, semiconductor film layer 13, film electrode 14 forms an MIM component (metal-insulator-metal) or a Schottky diode. The thickness of the semiconductor film layer is typically 1 µm or less.

Suitable photoactive layers can furthermore also be comprised of one or more semiconducting plastics that are available as monomers, oligomers and/or polymers. These layers can also incorporate inorganic particles and/or nanoparticles, whereby these inorganic particles and/or nanoparticles can exist with electron affinities similar to or different than the semiconducting plastic material and/or with band gaps similar to or different than the semiconducting plastic material. Mixtures made from two or more conjugate organic plastics and the like can also be used.

The thin layers—the film electrodes or the semiconductor film layers—formed of organic molecules, oligomers or molecular mixtures can be generated, for example, by thermal vaporization or cathode sputtering. Thin layers made from conjugate polymers and mixtures with conjugate polymers can be generated via spin coats (solution centrifuging), but also via continuous printing methods such as, for example, screen printing, inkjet printing, flexoprinting, gravure printing, relief printing, planographic printing or other similar solvent separation processes.

It is also possible to form the semiconductor film layer 13 in the form of a donor/acceptor polymer mixture. The examples cited above of typical semiconducting conjugate polymers all act as a donor; suitable acceptors can, for example, be poly(cyanophenylenevinylene), fullerene such as C-60 and its functional derivatives (such as PCBM, PCBR) and organic molecules, organometallic molecules or inorganic nano-particles (such as, for example, CdTe, CdZnTe, CdSe, CdS, CuInSe$_2$). These acceptor examples are not exclusive.

FIG. 3 shows a further example of an Inventive dose measurement device 8b. The design is fundamentally the same as with regard to the dose measurement device 8a specified in FIG. 2, however this embodiment differs in the semiconductor film layer 13. The semiconductor film layer 13 in this exemplary embodiment is fashioned as a heterojunction, or alternative to that as a PN-junction. The semiconductor film layer 13 that shows a real heterojunction is comprised of a first sub-layer 15 and a second sub-layer 16, both comprised of different materials. One of these sub-layers can thereby be comprised of one of the low-molecular-weight organic semiconductors specified above or a mixture thereof. Further possible semiconductors are, for example, cyano-polyphenylenevinylene (Combination network-PPV). In this specified arrangement, a heterojunction exists at the boundary surface between the two sub-layers 15 and 16.

Alternative to this, the semiconductor film layer 13 shown in FIG. 3 can also be fashioned as a layer comprising a pn-junction, such that overall a pn-diode results. Such a pn-layer starts from a uniform semiconductor material or a material mixture that is, however, doped differently in both sub-layers 15 and 16. One sub-layer is doped with a donor (n-type doping), the other with an acceptor (p-type doping). For example, polythiophene (PT) or polyphenylenevinylene (PPV) can be used as an n-semiconductor material acting as a donor; for example, a fullerene C-60 can be used as an acceptor, thus as a p-doping. In this case, one starts from a basic semiconductor material (namely PT or PPV) acting as a donor: this forms, for example, the n-sub-layer 15; the p-sub-layer (for example the sub-layer 16) is generated via corresponding doping.

As an alternative to the real layer doping as shown in FIG. 3, R is possible to fashion voluminous heterojunctions for which both different semiconductor materials are mixed, such that heterojunctions are fashioned in the entire layer volume and not only at the boundary surface.

The low x-ray absorption of the inventive absorption arrangement or diode structure can, however, lead to that the generated electrical signal is very small. This can be improved using a scintillator that is so thin that it absorbs only very little x-ray radiation, but with which the signal is amplified so that it can be evaluated well.

FIG. 4 shows a first inventive embodiment of such a dose measurement device 8c. A carrier 11, both film electrodes 12 and 14 and the semiconductor film layer 13 located between them are also used here. The basic design can be described just as with regard to FIGS. 2 and 3. In this embodiment, a thin scintillator layer 17 is applied to the upper film electrode 13 in order to increase the sensitivity. The scintillator layer converts incident radiation into visible light that is then coupled through the film electrode 14 (that is preferably optically transparent) into the semiconductor film layer 13 to generate the electron-hole pair. The scintillator layer 17 can, for example, be a gadolinium oxisulfide layer ($Gd_2O_2S$) with a coating of, for example, 3 mg/cm$^3$. The gadolinium oxisulfide powder exhibits a particle [grain] size between 7 and 12 µm; the powder can be suspended in a solution of polyvinyl chloride in butyl acetate. After the application of the suspension to the diode structure, the layer is dried for a plurality of hours at 40° C., such that the solidified scintillator layer 17 forms.

Figure 5:
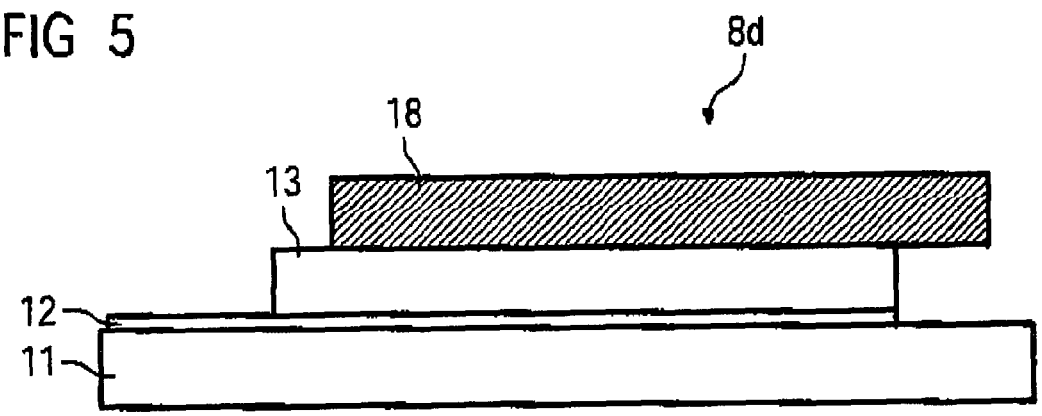
FIG. 5 shows an inventive dose measurement device in a fourth embodiment.

FIG. 5 shows an alternative embodiment of a dose measurement device 8d using a scintillator means. In this embodiment, no separate film electrode 14 and separate scintillator layer 17 are used, rather here an electrode 18 is applied that comprises a scintillator material in the form of a fine powder. This means the scintillator material is mixed into the electrode material. For example, a conductive polymer is mixed with the gadolinium oxisulfide specified above, applied and cured. This electrode 18 also exhibits a double function here, namely on the one hand that of the electrode, and on the other hand that of the scintillator. This arrangement is advantageous inasmuch as the coupling of the light generated scintillator-side immediately ensues in the semiconductor film layer 13 due to the direct contact.

Figure 6:
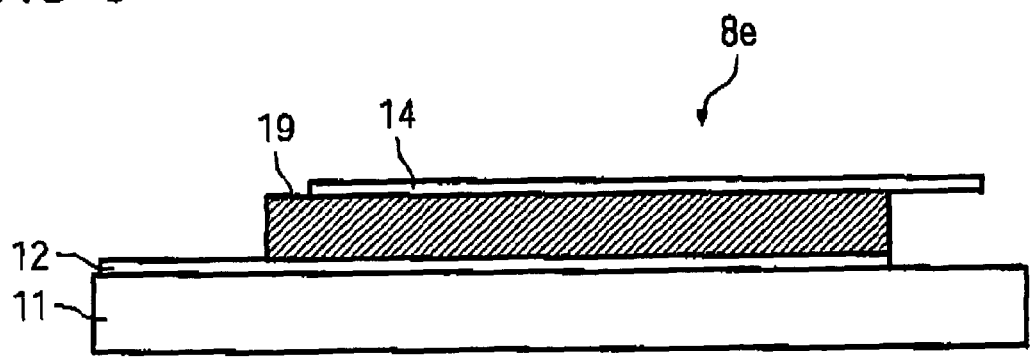
FIG. 6 shows an inventive dose measurement device in a fifth embodiment.

FIG. 6 shows a further particularly advantageous embodiment of a dose measurement device 8e. Here the scintillator material is introduced directly into the organic semiconductor film layer in a very finely distributed form, in particular as nano-particles. The powder particles of the scintillator have a size of approximately 2–7 nm (and are thus extremely fine) in order to be able to be very finely and homogenously distributed, and to enable the semiconductor film layer 19 to be able to be produced in the required thickness ≦1 µm. An advantage of this design is that, given incident radiation, the conversion of the same by the scintillator immediately ensues in the semiconductor film layer 19: upon radiation penetration, the semiconductor film layer glows internally. Electron-hole pairs are generated in the entire volume, since the radiation conversion by the scintillator ensues in the entire volume.

Figure 7:
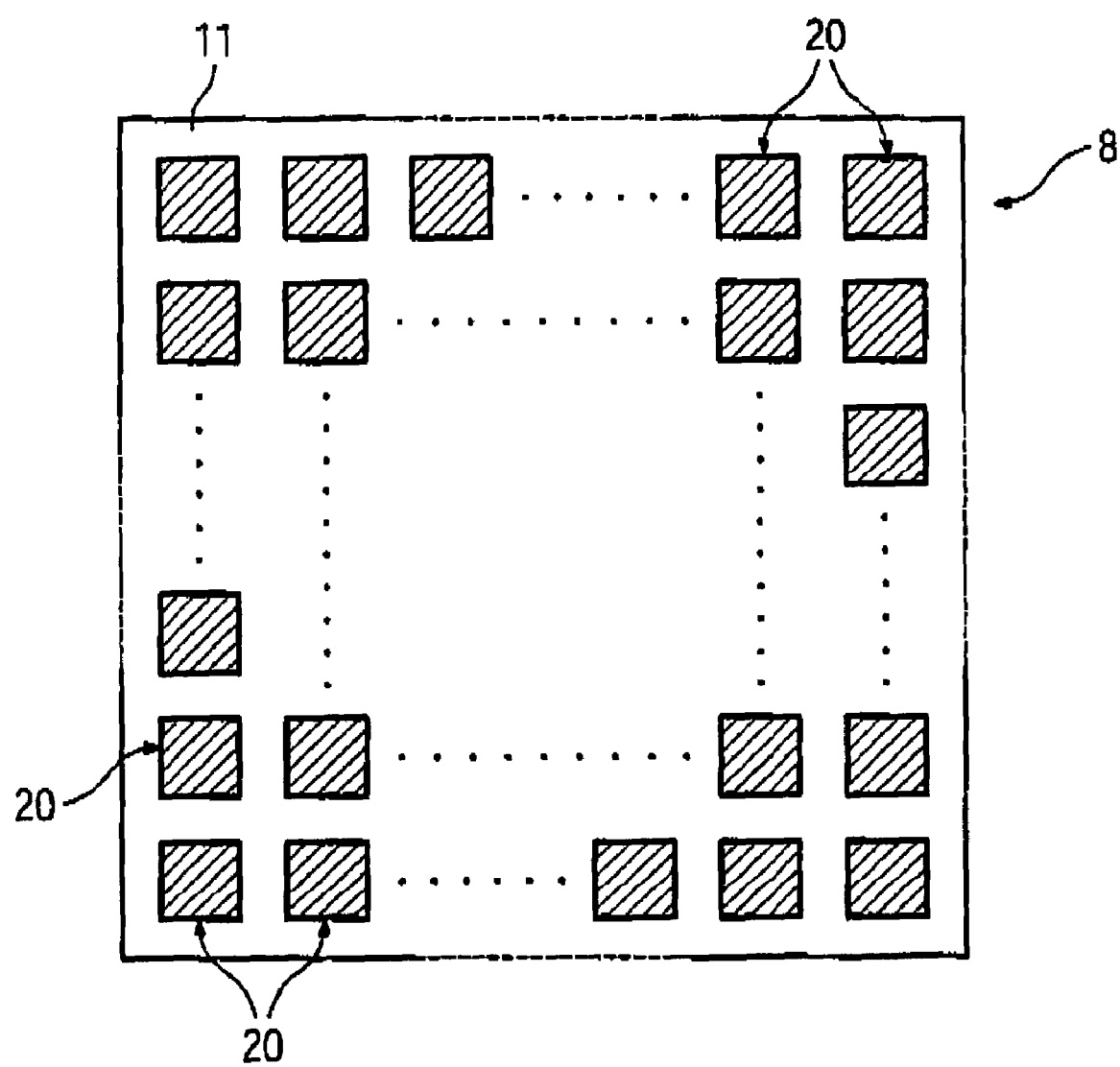
FIG. 7 shows an embodiment of an inventive dose measurement device with absorption structures arranged like a matrix.

FIG. 7 shows a dose measurement device 8 that can be fashioned according to any of the specified embodiments. FIG. 7 shows the foil-like carrier 11 on which a number of absorption structures 20 are provided distributed according to a type of matrix. Each of the absorption structures comprises a diode structure as they are specified in the preceding examples, as the case may be also a scintillator means depending on how the measurement device is fashioned. Each absorption structure 20 provides a separate local output signal, measurable by the correspondingly directed electrodes, that describes the local dose. The output signals can be read out separately, The individual absorption structures can also be arbitrarily circuited with one another in order to form different readout patterns. As an alternative to the embodiment specified in FIG. 7, naturally the possibility also exists to locally provide only the film electrodes 12 and 14 and to arrange a semiconductor film layer that coats the entire carrier 11. Because the film electrodes 12 and 14 are only locally provided, this means as well that only local output signals are read out. In this embodiment, It is also possible to effect the dose regulation of the x-ray system on the basis of the image region of interest, which is defined via suitable integration of the matrix-like absorption structures.

For any of the above embodiments, the dose measurement device 8 can be directly connected to the control detector 5; so that they form a common component.

Although modifications and changes may be suggested by those skilled in the art, it is the intention of the inventors to embody within the patent warranted hereon all changes and modifications as reasonably and properly come within the scope of their contribution to the art.

We claim as our invention:

1. A device for measuring an ionizing radiation dosage comprising:
   a foil-like carrier;
   a ionizing radiation absorption structure disposed on said foil-like carrier, said absorption structure comprising a plurality of thin-film layers disposed one above another, said layers comprising a layer embodying scintillator material and a layer forming at least one thin-film diode structure that supplies an output signal dependent on ionizing radiation incident on said absorption structure; and
   said diode structure comprising two film electrodes and a photo-active semiconductor film layer disposed between said two film electrodes, and said scintillator is integrated into one of the film electrodes.

2. A device for measuring an ionizing radiation dosage comprising:
   a foil-like carrier;
   a ionizing radiation absorption structure disposed on said foil-like carrier, said absorption structure comprising a plurality of thin-film layers disposed one above another, said layers comprising a layer embodying scintillator material and a layer forming at least one completely organic thin-film diode structure that supplies an output signal dependent on ionizing radiation incident on said absorption structure; and
   said at least one completely organic thin film diode structure comprising two film electrodes, each consisting of a conductive polymer, and a photo-active semiconductor film layer, consisting of at least one organic semiconductor, disposed between said two film electrodes.

3. A device as claimed in claim 2 wherein said photo-active semiconductor film layer is comprised of at least one organic semiconductor functioning as a donor, and an additional material functioning as an acceptor.

4. A device as claimed in claim 2 wherein said photo-active semiconductor film layer is comprised of two different semiconductors forming a heterojunction diode structure.

5. A device as claimed in claim 4 wherein said semiconductor film layer is formed by a first sub-layer comprised of a first of said two different semiconductors, and a second sub-layer comprised of a second of said two different semiconductors, said first and second sub-layers forming a heterojunction.

6. A device as claimed in claim 4 wherein said photo-active semiconductor film layer is comprised of a mixture of said two different semiconductors, forming a plurality of heterojunctions in said semiconductor film layer.

7. A device as claimed in claim 2 wherein said photoactive semiconductor film layer is comprised of a p-doped first sub-layer and an n-doped second sub-layer, forming a pn-junction.

8. A device as claimed in claim 2 wherein said organic semiconductor material is selected from the group consisting of semiconducting conjugate polymers, derivatives of semiconducting conjugate polymers, low molecular weight semiconductors, and plastics selected from the group consisting of monomers, oligomers and polymers.

9. A device as claimed in claim 2 wherein said foil-like carrier is comprised of a material selected from the group consisting of plastic and glass.

10. A device as claimed in claim 2 wherein said photoactive semiconductor film layer has a thickness of less than or equal to 1 µm.

11. A device as claimed in claim 2 wherein at least one of said film electrodes has a thickness of less than equal to 2 µm.

12. A device as claimed in claim 11 wherein at least one of said film electrodes has a thickness of less than or equal to 1 µm.

13. A device as claimed in claim 2 wherein said absorption structure comprises a plurality of layers applied by an application technique selected from the group consisting of thermal vaporizations, cathode sputtering, solution centrifuging, and printing.

14. A device as claimed in claim 2 wherein said absorption structure is a first absorption structure, and comprising a plurality of further absorption structures disposed in said foil-like carrier.

* * * * *